United States Patent

Tung

[11] Patent Number: 6,131,928
[45] Date of Patent: Oct. 17, 2000

[54] BARS OF TRUNKS AND THE LIKE

[76] Inventor: Chen Chang Tung, P.O. Box 63-150, Taichung City, Taiwan

[21] Appl. No.: 09/211,494

[22] Filed: Dec. 14, 1998

[51] Int. Cl.$^7$ .................................................. A47B 95/02
[52] U.S. Cl. ............................. 280/47.315; 280/47.371; 280/655; 280/655.1; 280/37; 16/113.1; 403/109.3
[58] Field of Search .................... 280/47.315, 47.371, 280/655, 655.1, 47.31, 47.26, 37, 819, 823; 16/113.1, 405, 429; 190/18 A, 115, 117; 135/69, 75; 403/109.2, 109.3

[56] References Cited

U.S. PATENT DOCUMENTS

| | | | |
|---|---|---|---|
| 3,998,476 | 12/1976 | Kazmark, Sr. | 280/655 |
| 4,354,689 | 10/1982 | Perego | 280/47.371 |
| 4,577,877 | 3/1986 | Kassai | 280/47.371 |
| 4,915,408 | 4/1990 | Clemence et al. | 280/655 |
| 5,367,743 | 11/1994 | Chang | 16/115 |
| 5,460,393 | 10/1995 | Tsai | 280/655 |
| 5,692,266 | 12/1997 | Tsai | 16/115 |
| 5,694,663 | 12/1997 | Tserng | 16/115 |
| 5,806,143 | 9/1998 | Tsai | 16/115 |
| 5,876,048 | 3/1999 | Lee | 280/47.315 |
| 5,893,196 | 4/1999 | Tserng | 16/115 |
| 5,970,579 | 10/1999 | Lu | 16/115 |

*Primary Examiner*—Richard M. Camby
*Assistant Examiner*—Bridget Avery

[57] ABSTRACT

An adjusting and positioning structure for handle bars of trunks and the like including a securing tube assembly fixedly mounted on one side of a trunk. The securing tube assembly is hollow and is axially, pivotally provided with a handle bar in a slidable manner. At least one positioning pin urged against by an elastic element is fixedly provided in a radial parallel position of the handle bar. A control pin likewise subjected to the urging action of an elastic element is disposed below the positioning pin in a parallel position. One side of the control pin has a limiting portion capable of controlling axial displacement of the positioning pin. The securing tube assembly is radially provided with a plurality of axially spaced positioning portions corresponding respectively to the positioning pin and the control pin for receiving the positioning pin and the control pin inserted therein. The positioning portion corresponding to the control pin further extends downwardly to a certain axial distance to form an urging end at a bottom end thereof to urge against and control the axial displacement of the control pin when the latter displaces downwardly. By means of this arrangement, the handle bar can be pressed downwardly very quickly and then pulled axially upwardly very quickly to achieve adjustment and positioning of the handle bar.

5 Claims, 2 Drawing Sheets

BARS OF TRUNKS AND THE LIKE

BACKGROUND OF THE INVENTION (a) Field of the Invention

The present invention relates generally to a trunk, and more particularly to an adjusting and positioning structure for handle bars of trunks and the like.

(b) Description of the Prior Art

Travelers generally carry a type of trunk that has a retractable handle bar the length of which can be adjusted to suit the user. In use, the user holds the handle bar and sets the trunk at an angle to the floor, and the trunk can be pulled along on its casters. The adjustment and positioning of the handle bar on the trunk is generally achieved by utilizing positioning pins, springs, and inner and outer hollow tubes, as well as round through holes that correspond and receive the positioning pins that are positioned in series. However, in operation, a structure as such requires the user of both hands. Firstly, the user needs to press the serially connected positioning pins with his/her fingers so that they retract from the limitation of the round through holes. Then the user needs to pull the handle bar upwardly or press it downwardly with the other hand to adjust the length of the handle bar to a desired length. Such operation is very inconvenient and may even hurt the user's hands.

SUMMARY OF THE INVENTION

A primary object of the present invention is to provide an adjusting and positioning structure for handle bars of trunks and the like, in which the handle bar can be adjusted and positioned with a single hand in a very quick manner.

According to the present invention, an adjusting and positioning structure for handle bars of trunks and the like comprises a securing tube assembly fixedly mounted on one side of a trunk. The securing tube assembly is hollow and is axially, pivotally provided with a handle bar in a slidable manner. At least one positioning pin urged against by an elastic element is fixedly provided in a radial parallel position of the handle bar. A control pin likewise subjected to the urging action of an elastic element is disposed below the positioning pin in a parallel position. One side of the control pin has a limiting portion capable of controlling axial displacement of the positioning pin. The securing tube assembly is radially provided with a plurality of axially spaced positioning portions corresponding respectively to the positioning pin and the control pin for receiving the positioning pin and the control pin inserted therein. The positioning portion corresponding to the control pin further extends downwardly to a certain axial distance to form an urging end at a bottom end thereof to urge against and control the axial displacement of the control pin when the latter displaces downwardly. By means of this arrangement, the handle bar can be pressed downwardly very quickly and then pulled axially upwardly very quickly to achieve adjustment and positioning of the handle bar.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
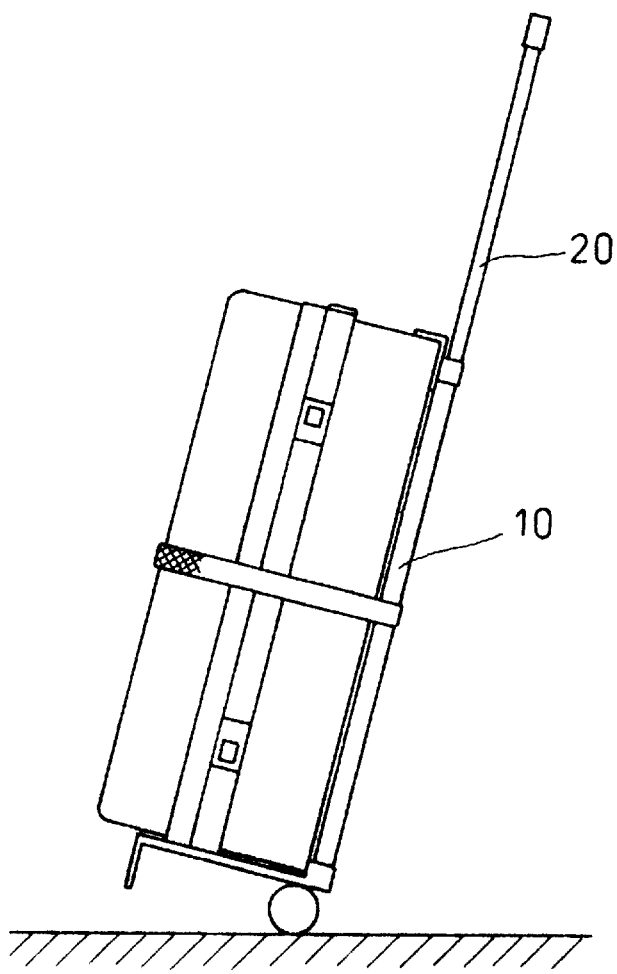
FIG. 1 is a perspective assembled view of a preferred embodiment of the present invention.
Figure 2:
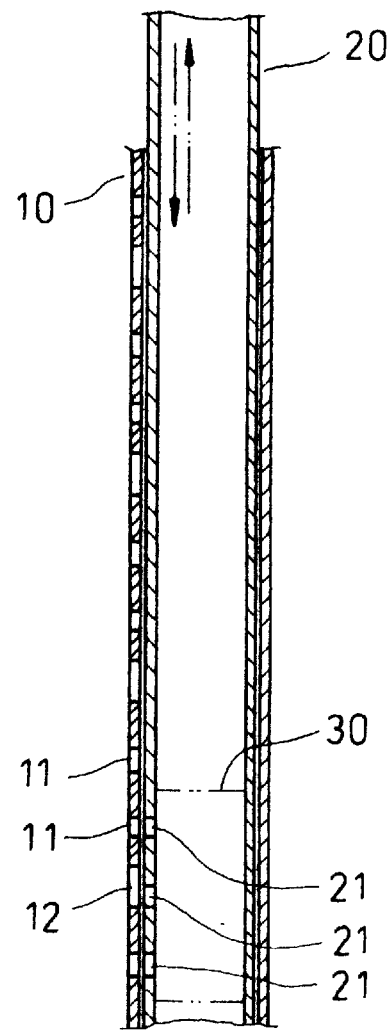
FIG. 2 is a sectional assembled view of the handle bar structure of the present invention.

With reference to FIGS. 1 and 2, a preferred embodiment of an adjusting and positioning structure for handle bars of trunks and the like comprises a hollow securing tube assembly 10 fixedly mounted at an abdominal side of a trunk, a handle bar 20, and a positioning component 30.

Figure 3:
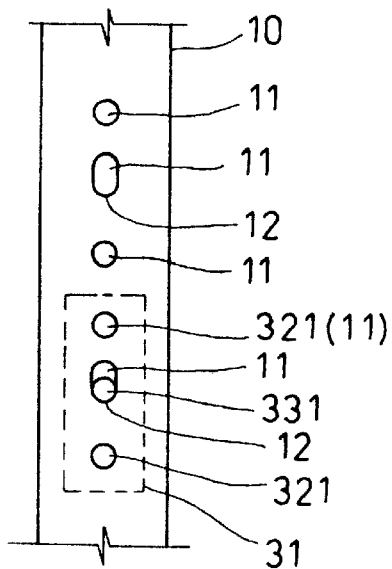
FIG. 3 is a schematic view of the handle bar structure of the present invention.

The securing tube assembly 10 is, like the prior art, fixed at the abdominal side of the trunk in a parallel configuration. A plurality of positioning portions 11 in the form of through holes are spaced in sequence on one side of the tube wall in an axial direction. As shown in FIG. 3, the positioning portions 11 are divided into units of three, i.e., upper, intermediate, and lower positioning portions, in which the intermediate one extends downwardly to a certain distance to form an urging end 12 at a bottom end thereof. The handle bar 20 is hollow as shown in FIG. 2. It is pivotally provided in the interior of the securing tube assembly 10 in an axial slidable manner, adapted to be held and pulled by the user. The bottom end of the handle bar 20 is provided with three round holes 21 that go through the side wall and correspond to the positioning portions 11 at the bottom end of the securing tube assembly 10.

Figure 4:
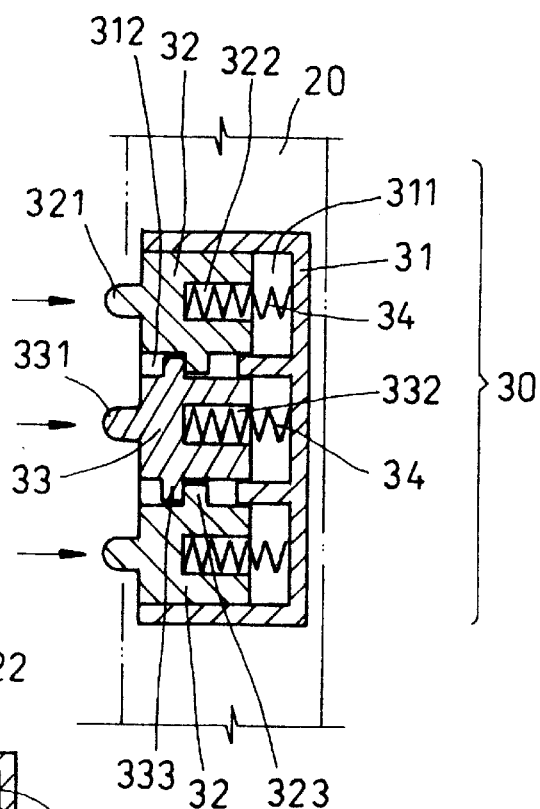
FIG. 4 is a schematic view showing adjustment of the handle bar structure of the present invention.

Referring to FIG. 4, the positioning component 30 includes a positioning seat 31, two positioning pins 32, a control pin 33, and three elastic elements 34 in the form of retractable springs. The positioning seat 31 is plastic injection molded integrally and is secured axially in the interior of the handle bar 20 at where the three round holes 21 are. The positioning seat 31 is provided with upper, intermediate, and lower receiving groove portions 311 that are parallel to each other and correspond to the three round holes 21 respectively. Adjacent to the receiving groove portions 311 are respectively provided guide grooves 311 that communicate therewith. The two positioning pins 32 are slidably provided in the upper and lower receiving groove portions 311. An axial front end of each positioning pin 32 reduces radially to form an urging end 321, as shown in FIGS. 3 and 4, to pass through the corresponding round holes 21 to axially insert into the corresponding upper and lower positioning portions. An axial rear end of each positioning pin 32 is provided with an axial hole 322 for receiving and positioning the corresponding elastic element 34. An abdominal side of the positioning pin 32 corresponding to the guide groove 312 is provided with a projecting drag block 323.

The control pin 33 is disposed in the intermediate receiving groove 311 in a slidable manner. An axial front end of the control pin 33 is radially reduced to form an urging end 331, as shown in FIGS. 3 and 4, to pass through the corresponding round hole 21 so as to axially insert into the corresponding intermediate positioning portion 11. An axial rear end of the control pin 33 is provided with an axial hole 332 for receiving and positioning the corresponding elastic element 34 in the form of a retractable spring. An abdominal side of the control pin 33 corresponding to the guide groove 312 is provided with two limiting portions 333 to urge against and limit the drag block 323 so as to displace axially in a linking-up operation.

In use, the user needs only to operate the handle bar with a single hand by pressing downwardly the handle bar quickly and then pulling up axially, as shown in FIGS. 3 and 4. When the handle bar 20 displaces axially downward in a quick manner, the urging end of the control pin 33 is urged against and pushed by the urging end of the corresponding positioning portion that displaces axially, and the control pin 33 compresses axially the corresponding elastic element 34 which shrinks inwardly. At the same time, the drag blocks 323 of the two positioning pins 32 are urged against and limited by the two limiting portions 333 on both sides of the control pin 33, forcing the positioning pins 32 to displace axially with the control pin 33 in a linking-up operation. Therefore, the urging ends 321, 331 of the respective positioning pins 32 and the control pin 33 withdraw from engagement with the positioning portions 11. Subsequently, when the handle bar 20 is pulled axially upwardly in a quick manner, since the handle bar 20 is pulled upwardly abruptly and very quickly, the withdrawn positioning pins 32 and the control pin 33 allow the handle bar 20 to be pulled upwardly to a required length (i.e., the positioning of the three positioning portions in the same unit) before the elastic elements 34 can respond, as shown in FIG. 3. When the handle bar 20 has reached the required length, the resetting elasticity of the respective elastic elements 34 urge against the urging ends 321, 331 to once again insert into the corresponding positioning portions 11 axially, thus achieving positioning of the adjusted handle bar 20. If adjustment of the length of the handle bar 20 is desired, the handle bar 20 is always pressed downwardly and then upwardly in a very quick manner using a single hand.

When the user pulls the trunk by the handle bar 20 the length of which has been adjusted, the urging ends 321 of the two positioning pins 32, under the pressure of the elastic elements 34, insert firmly and axially into the corresponding positioning portions 11, whereas the urging end 331 of the control pin 33 and the intermediate positioning portion 11 maintain a suspended engagement state without being subjected to a radial force. In other words, when the handle bar 20 is pulled axially, the radial force is borne by the two positioning pins 32, thus ensuring that the handle bar 20 will not slip out of position when being pulled.

Figure 5:
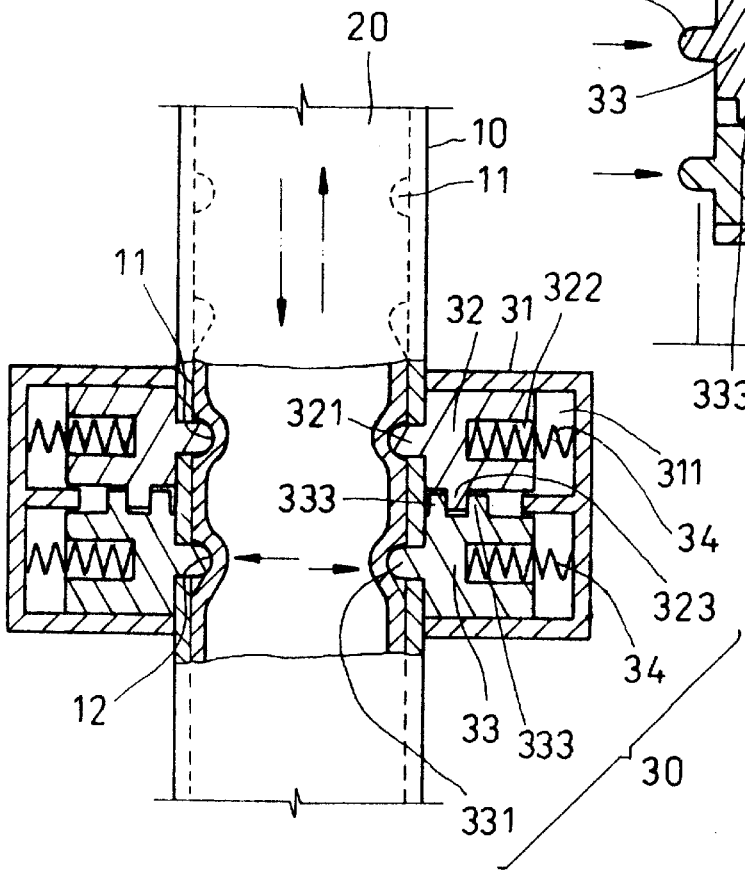
FIG. 5 is a schematic view of assembly of another preferred embodiment of the present invention.

In addition, since the control pin 33 of the positioning component 30 utilizes the limiting portion 333 projecting from one side thereof to cause the positioning pins 32 to displace axially therewith, it may be configured to have another embodiment as shown in FIG. 5. As shown, a positioning pin 32 and control pin 33 are arranged in a parallel manner; the handle bar 20 and the securing tube assembly 10 are configured to be flat with the spaced positioning portions 11 on the left and right sides in a symmetrical arrangement. With the positioning component 30 arranged symmetrically on both sides, this embodiment can also enable the user to adjust and operate the handle bar using a single hand.

Although the present invention has been illustrated and described with reference to the preferred embodiment thereof, it should be understood that it is in no way limited to the details of such embodiment but is capable of numerous modifications within the scope of the appended claims.

What is claimed is:

1. An adjusting and positioning structure for handle bars of trunks and the like, comprising a securing tube assembly that is hollow and secured on one side of a trunk; a handle bar that is provided pivotally and axially in said securing tube assembly in a slidable manner; and a positioning component that is capable of positioning said handle bar in said securing tube assembly, wherein said positioning component includes at least one positioning pin that is subjected to the urging action of an elastic element to displace axially, said positioning pin being disposed in a radial parallel position of said handle bar, a control pin that is likewise subjected to the urging action of an elastic element being disposed below said positioning pin in a parallel position, one side of said control pin having a limiting portion capable of controlling axial displacement of said positioning pin, said securing tube assembly being radially provided with a plurality of axially spaced positioning portions corresponding respectively to said positioning pin and said control pin for receiving said positioning pin and said control pin inserted therein, the positioning portion corresponding to said control pin further extending downwardly to a certain axial distance to form an urging end at a bottom end thereof to urge against and control the axial displacement of said control pin when the latter displaces downwardly, whereby said handle bar can be pressed downwardly very quickly and then pulled axially upwardly very quickly to achieve adjustment and positioning of said handle bar.

2. An adjusting and positioning structure for handle bars of trunks and the like as defined in claim 1, wherein said positioning portions of said securing tube assembly are preferably through holes.

3. An adjusting and positioning structure for handle bars of trunks and the like as defined in claim 1, wherein said positioning pin and said control pin are commonly received in a positioning seat, said positioning seat being plastic injection molded integrally and having upper, intermediate, and lower receiving grooves that are spaced apart in a parallel manner to allow slidable displacement and positioning of said positioning pin and said control pin, each of said receiving grooves communicating with a guide groove disposed adjacent thereto.

4. An adjusting and positioning structure for handle bars of trunks and the like as defined in claim 1, wherein said positioning pin and said control pin each having a front axial end that reduces radially to form an urging end, and an axial rear end that is provided with an axial hole for receiving and positioning the corresponding elastic element.

5. An adjusting and positioning structure for handle bars of trunks and the like as defined in claim 1, wherein one side of said positioning pin is provided with a projecting drag block at where it corresponds to said guide groove of said positioning seat, said drag block being controlled by said limiting portion of said control pin.

\* \* \* \* \*